United States Patent [19]

Schenach et al.

[11] Patent Number: 5,079,338

[45] Date of Patent: Jan. 7, 1992

[54] THERMOSETTING BIS(ISOIMIDE) RESIN COMPOSITION

[76] Inventors: Thomas A. Schenach, 6531 Meath Cir., Huntington Beach, Calif. 92647; John D. Harper, P.O. Box 33/Suite 369, Long Beach, Calif. 90801

[21] Appl. No.: 598,831

[22] Filed: Oct. 15, 1990

[51] Int. Cl.$^5$ .............................................. C08G 67/02
[52] U.S. Cl. ..................................... 528/345; 525/132; 525/149; 525/181; 525/184; 526/271; 528/205; 528/332; 528/339; 528/354; 528/392
[58] Field of Search ............... 528/345, 332, 392, 339, 528/205, 354; 526/271; 525/132, 149, 181, 184

[56] References Cited

U.S. PATENT DOCUMENTS 4,732,963  3/1988  Wank et al. ........................ 528/205

Primary Examiner—Harold D. Anderson
Attorney, Agent, or Firm—Thomas A. Schenach

[57] ABSTRACT

An improvement in thermosetting bis(isoimide) resin compositions is achieved by replacing a small part of the unsaturated carboxylic acid anhydride starting material with a stoichiometrically equivalent amount of a poly(diolefin)-unsaturated carboxylic acid anhydride adduct.

3 Claims, No Drawings

THERMOSETTING BIS(ISOIMIDE) RESIN COMPOSITION

This invention relates to polyimide resins. More particularly, it relates to an improvement in thermosetting polymer resins based on bis(maleisoimides), achieved by incorporating into the unsaturated carboxylic acid anhydride starting material a small percentage of a poly(-diolefin)-unsaturated carboxylic anhydride adduct.

BACKGROUND OF THE INVENTION

Thermosetting resins based on ethylenically unsaturated N,N-bis(imides)

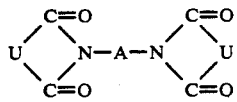

wherein U represents a divalent radical containing a carbon-to-carbon double bond and A represents a divalent radical having at least two carbon atoms, are well known in the art. These bis(imides) may be converted to polyimide resins by heating as taught by Grundschober and Sambeth, U.S. Pat. No. 3,380,964. Alternately, they may be coupled with appropriate multifunctional reactants such as aromatic diamines—see for example, Bargain and Combet, U.S. Pat. No. Re. 29,316. Inasmuch as the rate of polymerization of the bis(imides) can be controlled by temperature, it is customary to carry out a partial polymerization to form an oligomer or "prepolymer" which still retains some degree of solubility in certain solvents. The prepolymer solutions are then used to impregnate fibrous materials such as graphite or glass cloth. These impregnated mixtures are conventionally referred to as "pre-pregs". The solvent is then stripped from the pre-preg, and further heat and usually pressure are applied to complete the polymerization of the bis(imide) and form the final cured composite article with the fibers held in a resin matrix. Cured bis(imide) resins and composites made therefrom have excellent chemical resistance and good thermal stability.

Recently, Wank and Harper in U.S. Pat. No. 4,732,963 have disclosed a new family of thermosetting resins based on the bis(isoimide) structure:

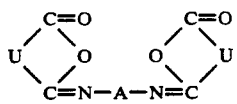

wherein U represents again a divalent radical containing a carbon-to-carbon double bond and A represents a divalent radical having at least two carbon atoms. These bis(isoimides), in combination with dihydric phenols, can be partially polymerized to form prepolymers which are readily soluble and stable in low-boiling solvents such as acetone and methyl ethyl ketone. Conventional bis(imide) prepolymers, on the other hand, must be dissolved in high boiling solvents such as dimethylformamide or N-methylpyrrolidone, which are more difficult to remove during subsequent processing—moreover these solutions are relatively unstable. Once finally cured, however, bis(isoimide) resins possess the characteristic advantages of the polyimides—excellent chemical resistance and thermal stability. The same raw materials can be used to prepare both conventional bis(imides) and the bis(isoimides) of Wank and Harper. An unsaturated carboxylic acid anhydride such as maleic anhydride is reacted with a diamine, preferably an aromatic diamine such as methylene dianiline to form a bis(maleamic acid)

wherein U and A are defined as hereinabove. Dehydration of the bis(maleamic acid) with acetic anhydride-sodium acetate yields a conventional bis(imide). On the other hand, dehydration with dicyclohexylcarbodiimide will yield the bis(isoimide)—see Sauers, Cotter, and Whelan, *Journal of Organic Chemistry* vol. 26(1), p. 10 (1961).

We have now discovered that unexpected improvements in the thermal properties of the bis(isoimide) resin may be achieved by replacing a small percentage of the unsaturated carboxylic acid anhydride starting material with a stoichiometrically equivalent amount of a poly(-diolefin)-unsaturated carboxylic anhydride adduct. Reaction with a diamine, followed by dehydration of the bis(maleamic acid) product with dicyclohexylcarbodiimide, yields a bis(isoimide) mixture incorporating the poly(diolefin) functionality. This bis(isoimide) mixture, like the bis(isoimides) of Wank and Harper, can be polymerized with a dihydric phenol to yield prepolymers with solubility in low boiling solvents. These prepolymers can be further cured to form final resins with glass transition temperatures significantly higher than those of the bis(isomide)-dihydric phenol resins disclosed by Wank and Harper.

PRIOR ART

The closest prior art of which we are aware is Wank and Harper, U.S. Pat. No. 4,732,963.

DETAILED DESCRIPTION OF THE INVENTION

Unsaturated carboxylic acid anhydrides suitable as raw materials in the synthesis of the bis(isoimides) of Wank and Harper are also suitable for the improved bis(isoimides) of our invention. In the general formula for these anhydrides

U is an ethylenically unsaturated divalent radical containing from two to twelve carbon atoms. When maleic anhydride is used, U becomes —CH=CH—; when citraconic acid anhydride is used, U is —CH=C(CH$_3$)—; and so on. U may be part of a cyclic structure, and may contain heteroatoms other than carbon and hydrogen, provided that they do not give undesirable side reactions under our process conditions—for example, oxygen, nitrogen, sulfur, halogen. In the diamine raw materials which are combined with the unsaturated carboxylic acid anhydride,

A contains from two to thirty carbon atoms and may include cyclic and aromatic structures and heteroatoms other than carbon and hydrogen, such as oxygen, nitrogen, sulfur, and halogen, provided that they do not give undesirable side reactions. Aromatic diamines are preferred starting materials for the bis(isoimides), in which case the radical A becomes P-[(T)$_m$ (P')]$_n$-, wherein P and P' are ortho, meta, or paraphenylene rings (—C$_6$H$_4$—) or substituted derivatives thereof, T represents a bridging group connecting said phenylene rings, such as alkylene, substituted alkylene, oxo (—O—), thio (—S—), Sulfo (—SO$_2$—), carbonyl (—CO—), and the like, m is either zero or one, and n is a number from zero to three. Useful alkylene and substituted alkylene bridging groups include methylene (CH$_2$), ethylidene (—CH(CH$_3$)—), isopropylidene (—C(CH$_3$)$_2$—), and the like. A preferred unsaturated carboxcylic acid anhydride starting material is maleic anhydride, Preferred diamines are methylene dianilines, wherein T is —CH$_2$—, P and P' are both phenylene rings, and m and n are both one.

The modified bis(isoimides) of our invention are prepared by replacing a small percentage of the unsaturated carboxylic acid anhydride starting material with a stoichiometrically equivalent amount of a poly(diolefin)-unsaturated carboxylic acid anhydride adduct. Diolefins such as butadiene can be polymerized to viscous liquid or semisolid polymers having a significant number of 1,2 vinyl units in addition to internal cis- and trans-olefinic groups, Representative polymers have number average molecular weights (M$_n$) by gel permeation chromatography in the 2500 to 6500 range. These polymers can be reacted with unsaturated carboxylic acid anhydrides such those used in the syntheses of bis(imides) and bis(isoimides) to form adducts in which the anhydride moiety is retained and available for further reaction. It is likely that the addition of the unsaturated acid anhydride to the poly(diolefin) occurs via the Diels-Alder reaction in which the carbon-to-carbon double bond on the anhydride is condensed with double bonds on the poly(diolefin) to form a cyclic polyolefin-succinic anhydride. But, whatever the exact mechanism of addition, these adducts remain anhydrides, which can be subsequently reacted, for example, with diamines H$_2$N—A—NH$_2$ to form bis(maleamic acids), which in turn can be dehydrated to form bis(isoimides). As used herein, the expression "stoichiometrically equivalent amount of poly(diolefin)-unsaturated carboxylic acid anhydride adduct" refers to the anhydride groups on the poly(diolefin)—that is, the amount of anhydride in the poly(diolefin) adduct will combine with the same amount of diamine as the unsaturated carboxylic acid anhydride which is replaced by said adduct. A preferred poly(diolefin)-anhydride adduct is a polybutadiene adduct of maleic anhydride with a Brookfield viscosity of 20,000 to 50,000 centipoises at 25° C. and the following properties:

| | |
|---|---|
| Mn | 4500 |
| 1,2-vinyl units | 25% |
| 1,4-cis- and trans-olefin units | 75% |
| Acid number | 50 ± 5 mg/gm KOH equiv. |
| Adducted maleic anhydride | 10% |

Inasmuch as this polymer contains 10% combined anhydride, it will take ten parts of this adduct to replace one part of maleic anhydride in the synthesis of a bis(isoimide).

The improved bis(isoimides) of our invention are obtained by replacing from about 0.1% to about 7.0% of the unsaturated anhydride with a stoichiometrically equivalent amount of the poly(diolefin)-unsaturated carboxylic acid anhydride adduct. Smaller quantities of poly(diolefin)-anhydride do not produce a significant effect. Larger quantities may induce excessive reactivity and premature gellation during the dehydration of the bis(maleamic acids) or the prepolymer stages. Whereas the modified bis(isoimides) of our invention may be homopolymerized, it is preferred to copolymerize them with dihydric phenols, such as those employed by Wank and Harper and having the general formula HO—A'—OH, wherein A' is phenylene or substituted derivatives therof and contains from six to thirty carbon atoms. A' may additionally contain heteroatoms such as oxygen, nitrogen, sulfur, and halogen, provided that their presence does not lead to undesirable side reactions. Particularly useful are bis(phenols) represented by the general formula HO—P—(T)m—P'—OH wherein P, P', T, and m have the same meaning as defined above. Suitable dihydric phenols include p,p'-dihydroxydiphenylsulfone and 4,4'-isopropylidenediphenol (commonly known by the tradename "Bisphenol A"). The molar ration of bis(isoimide) to dihydric phenol should be between 50:1 and 1:1, and is preferably between two and six moles bis(isoimide) to one mole of dihydric phenol.

The manufacture of resins and resin composites using the improved compositions of our invention may be carried out in conventional ways, such as are taught in Wank and Harper. For example, mixtures of modified bis(isoimide) and dihydric phenol may be heated to melting about 300° F. and held there for from about five minutes to an hour to form a prepolymer. This prepolymer may be dissolved in methyl ethyl ketone or methyl ethyl ketone-toluene and used to impregnate a fibrous material, which is then dried and cured from 350° F. to 600° F. with pressure and vacuum being used, as is common in the art. Our invention will now be illustrated by Examples.

EXAMPLE 1

Preparation of a Poly (diolefin)-Modified Bis (isomaleimide)

A mixture of 9.75 grams maleic anhydride and 2.5 grams of polybutadiene-maleic anhydride adduct (equivalent to 0.25 grams maleic anhydride in anhydride content) was prepared in 100 milliliters of methylene chloride. A solution of 10 grams of 4,4'-methylene dianiline in 50 grams of methylene chloride was cautiously added. Considerable heat was evolved, enough to reflux the methylene chloride solvent, and a yellow precipitate of bis(maleamic acid) formed. After addition was complete, the mixture was allowed to stand for one hour to insure completeness of reaction. Then 18 grams of dicyclohexylcarbodiimide in 30 grams of methylene chloride was added. This reaction was slightly exothermic. When addition was complete, the reaction was refluxed briefly and then allowed to stand with occasional swirling for several hours to complete the reaction. The precipitate of dicyclohexyl urea was filtered out to obtain the bis(isomaleimide) product as a hazy yellow solution in methylene chloride. Evaporation of the solvent yielded the bis(isoimide) as a yellow powder.

EXAMPLE 2

Prepolymers were prepared from the following mixtures:

a) A commercial bis(maleimide) resin (from Mitsui Toatsu Ltd.) (100 parts) plus 20 parts 4,4'-methylene dianiline. This represents a bis(imide) from the prior art.
b) A mixture of bis(isoimide) prepared from maleic anhydride and 4,4'-methylene dianiline (100 parts) with bisphenol A (20 parts). This represents a bis(isoimide) resin composition from Wank and Harper, U.S. Pat. No. 4,732,963.
c) A mixture of a modified bis(isoimide) of our invention prepared from maleic anhydride, polybutadiene-maleic anhydride adduct, and 4,4'-methylene dianiline as in Example 1 (100 parts) with 20 parts bisphenol A.

These prepolymers were prepared by melting the mixture to 300° F. and holding them at that temperature for 10 minutes. The prepolymers were then dissolved and the solutions used to impregnate squares of glass cloth, at a resin loading of approximately two parts cloth to one part resin. The three "pre-pregs" were dried and subjected to a final cure at 400° F. and 250 psig. followed by a post-cure at 572° F. for three hours at atmospheric pressure. The glass transition temperature of the cured resin compositions were determined by differential scanning calorimetry (DSC). The results were as follows:

| Example | Tg(°C.) | Notes |
| --- | --- | --- |
| 2 (a) | 255 | 1 |
| 2 (b) | 278 | 2 |
| 2 (c) | 339 | 3 |

Notes:
1 A bismaleimide from the prior art
2 A prior art bis(maleisoimide) from U.S. Pat. No. 4,732,963
3 A modified bis(maleisoimide) of our invention Note that addition of the polybutadiene-maleic anhydride adduct to the bis(isoimide) synthesis (Example 2(c)) has resulted in a substantial elevation of the glass transition temperature of the resin produced therefrom, when compared to the corresponding bis(isoimide) resin of Wank and Harper (Example 2(b)). This elevation of the glass transition temperature indicates improved high temperature properties for the resins of our invention.

The above examples are by way of illustration only, and are not meant to be limiting within the scope of the following claims:

We claim:
1. In thermosetting polymer resin based on ethylenically unsaturated bis(isoimides) having the general structure

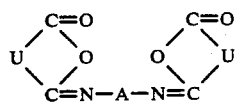

said bis(isoimides) being prepared from ethylenically unsaturated carboxylic acid anhydrides,

and diamines, $H_2N-A-NH_2$, wherein U represents a divalent radical containing a carbon-to-carbon double bond, and A represents a divalent radical having from two to thirty carbon atoms: the improvement comprising replacing from about 0.1 to about 7.0% of the ethylenically unsaturated carboxylic acid anhydride with a stoichiometrically equivalent amount of a poly(diolefin)unsaturated carboxylic acid anhydride adduct prepared by the addition of an unsaturated carboxylic acid anhydride to a poly(diolefin) having a number-average molecular weight in the 2500 to 6500 range.

2. Thermosetting polymer resin of claim 1 wherein the unsaturated carboxylic acid anhydride is maleic anhydride and the diamine is methylene dianiline.

3. Thermosetting polymer resin of claim 1 wherein the poly(diolefin)-unsaturated carboxylic acid anhydride adduct is a polybutadiene-maleic anhydride adduct having a number-average molecular weight of 2100, a weight-average molecular weight of 13,000 and approximately 10% adducted maleic anhydride.

* * * * *